United States Patent [19]

Kurka et al.

[11] Patent Number: 4,649,660
[45] Date of Patent: Mar. 17, 1987

[54] FISHING FLOAT ASSEMBLY

[76] Inventors: Jaroslav A. Kurka, 125 Wye Valley Road, Scarborough, Ontario, Canada, M1P 2A4; Jan J. Brandejs, 65 High Park Ave., Apt. 713, Toronto, Ontario, Canada

[21] Appl. No.: 859,395

[22] Filed: May 5, 1986

[51] Int. Cl.⁴ ............................................. A01K 85/00
[52] U.S. Cl. ...................... 43/17.5; 43/17.6; 43/43.1; 43/44.91; 43/44.95
[58] Field of Search ............. 43/17.5, 17.6, 43.1, 43/43.11, 44.90, 44.91, 44.92, 44.93, 44.94, 44.95

[56] References Cited

U.S. PATENT DOCUMENTS

| | | | |
|---|---|---|---|
| 862,853 | 8/1907 | Simmons | 43/44.91 |
| 2,627,693 | 2/1953 | Wanner | 43/44.95 |
| 2,763,088 | 9/1956 | Cowsert | 43/44.90 |
| 3,204,363 | 9/1965 | Dunham | 43/44.95 |
| 3,576,987 | 5/1971 | Voight | 43/17.6 |
| 3,921,328 | 11/1975 | Holcombe | 43/17.6 |
| 4,581,839 | 4/1986 | Mattison | 43/17.6 |
| 4,589,221 | 5/1986 | Mattison | 43/17.6 |

Primary Examiner—M. Jordan
Attorney, Agent, or Firm—Donald E. Hewson

[57] ABSTRACT

A fishing float assembly for use with a fishing line, and having a chemiluminescent light stick assembled thereto, is provided. The fishing float is a standard fishing float, having an upstanding substantially rigid circular neck at its top, to which is assembled an attachment portion. The attachment portion comprises a body having a sleeve in its lower end, where the sleeve has one or a plurality of slits formed along its length, and has a collar fitted over the sleeve. Either or both of the sleeve and collar may have sloping faces such that downward movement of the collar along the sleeve causes the sleeve to constrict and thereby grip the neck portion of the float. At the upper end of the body of the attachment portion, a socket is formed and dimensioned so as to grippingly retain a chemiluminescent light stick when placed therein. The light sticks are, themselves, available in the market, and have standard and constant dimensions.

20 Claims, 12 Drawing Figures

FISHING FLOAT ASSEMBLY

FIELD OF THE INVENTION

This invention relates to a fishing float assembly for use with fishing lines, where a fishing float may have a chemiluminescent light stick securely but detachably fitted to it, so as to be visible at night. The invention particularly relates to a fishing float assembly having an attachment device for attachment to generally universal fishing floats, and being of the kind that will accept and accommodate a chemiluminescent light stick of the sort which comprises two luminescent reactants that combine one with the other when the flexible container of the light stick is flexed; thereby so as to comprise a self-contained light source which may be visible for a considerable distance above the surface of the water so as to indicate to a watching fisherman when a fishing line below the float has been taken by a fish.

BACKGROUND OF THE INVENTION

There have been a number of attempts to provide greater excitement to the sport of fishing at night, some of which relate to the provision of lights or light sources that are attractive to fish, and others of which relate to the provision of lights or signalling means that indicate when a fish has been caught. In some jurisdictions, the former approach may not be totally acceptable, comprising as it were the practice of "jack lighting" whereby a light or other illumination is provided to attract fish to a specific area at which they might be caught such as by a net.

On the other hand, many fisherman are content to use approved lures or bait, but may wish to have a means whereby they may receive a signal when a fish has been caught. This may be especially true where a single fisherman may be tending several fishing lines, perhaps at various points around him such as off both sides of a boat or a dock. Usually, for such kind of fishing procedures, a fisherman rigs his fishing line with a lure or bait so that a fish hook or hooks associated with the lure or bait are suspended into the water at a specific distance below the surface thereof. To do so, the fisherman will use a fishing float attached to his fishing line, where the float simply floats at the surface of the water, and where a particularly violant bobbing motion of the float is indicative of the fact that a fish has taken the bait or lure at the end of the fishing line to which the float is attached.

However, the use of a fishing float has, heretofore, been acceptable only in daylight hours, or using several prior art devices as described hereafter, because the float may itself not be visible after dark. The present invention seeks to resolve those shortcomings, using a novel approach by adapting an attachment to an otherwise standard fishing float, and using a chemiluminescent light stick as a light source, so that the fishing float assembly provided by the present invention is completely self contained and will give the desired signal to the watching fisherman throughout the whole night—from dusk to dawn—if desired.

Moreover, the present invention provides a fishing float assembly which is of the sort that can be accepted in every jurisdication, because the chemiluminescent light stick which is adapted to be fitted to a fishing float by the attachment of the present invention would not, of itself, be attractive to and in most cases would not even be seen by fish below the surface of the water.

The chemiluminescent light sticks of the sort that are particularly useful for purposes of the present invention include those which are provided to the market by American Cyanamid Company in association with its trade mark CYALUME. Those devices are of the sort that are particularly taught in BOLLSKY et al, U.S. Pat. No. 3,597,362 dated Aug. 3, 1971, or VOIGHT et al, U.S. Pat. No. 3,576,987 dated May 4, 1971. It is not the purpose of the present invention to teach in detail those light stick structures; suffice it to say that generally they may have a diameter of approximately 2.9 mm. and a length of approximately 24 mm., and that they comprise a flexible light transmitting container that is filled with a first luminescent reactant, and a breakable container within the flexible container which is filled with a second luminescent reactant. The flexing of the flexible container causes the breakable container to break, thereby allowing mixing of the two luminescent reactants, and thereby causing chemiluminescence. Of course, such chemiluminescent light sticks, once activated, have a limited life—twelve to twenty hours; but on the other hand, they are relatively inexpensively obtained, and are self contained and independent of any external energy or light source. Moreover, chemiluminescent light sticks of the sort contemplated to be used by the present invention are non-toxic and non-radioactive, thereby being perfectly safe to be handled.

Typical fishing lures of the sort that rely for their fish attracting function on the presence of a chemiluminescent stick or wand include HOLCOMBE, U.S. Pat. Nos. 3,861,072 issued Jan. 21, 1975 and 3,921,328 issued Nov. 25, 1975. Other similar patents include BERCZ et al, U.S. Pat. No. 3,708,903 issued Jan. 9, 1973, and PURLIA, U.S. Pat. No. 3,863,380 issued Feb. 4, 1975. However, all of those patents relate to fishing lures, which are below the water and are generally associated with fish hooks, and are of the type that are designed to be specifically attractive to fish so as to catch the fish when they attempt to bite the lure and its associated hooks.

Other patents relating to fishing bobbers or floats that may have lights associated with them include KLOCKSIEM, U.S. Pat. No. 4,516,349 issued May 14, 1985. However, that patent is, to all intents and purposes, nothing more than a flashlight in the shape of a float or bobber, having a battery mounted within the bobber so that a lamp associated with it may be illuminated. Another fishing float which not only accepts a penlight but also reflects a portion of the light downwards so as to attract fish is that taught in YOUNG, U.S. Pat. No. 4,291,484 issued Sept. 29, 1981.

Yet another fishing float is taught by MORRIS et al in U.S. Pat. No. 3,913,256 issued Oct. 21, 1975; where the float itself is comprised of light emmiting material and is connected with a power source. Other battery powered fishing float/light assemblies include DURHAM, U.S. Pat. No. 3,739,513 issued June 19, 1973; ADAMS, U.S. Pat. No. 3,608,227 issued Sept. 28, 1971; and MANROSS, U.S. Pat. No. 3,528,188 issued Sept. 15, 1970.

One night fishing signal which relies upon a chemiluminescent light stick structure is PRICE et al, U.S. Pat. No. 4,505,063 issued Mar. 19, 1985. However, that patent teaches the use of a fishing pole having a device fitted to the end thereof, and being so arranged that upon a fish having been caught, an inner container is broken to allow mixing of the chemiluminescent reactants, thereby signalling the fact that a fish has been hooked. Of course, such a structure is usable only once, and involves the necessity of having to dispose of the light stick and replace it with another one so as to determine when another fish may be caught.

In contradistinction to all of the above, the present invention provides a fishing float assembly which has a float that is generally of a type readily obtainable in any sporting goods store, which float has a substantially rigid upstanding circular neck portion at its top; to which the present invention provides an attachment portion fitted over the upstanding neck, into which attachment portion an activated light stick may be inserted and grippingly retained.

The attachment portion of the fishing float assembly according to the present invention has a body portion having a lower constrictable sleeve and an upper socket, and a collar fitted over the sleeve and moveable up and down along its length. The sleeve has at least one slit formed along at least a portion of its length, and at least one of the outer surface of the sleeve and the inner surface of the collar has a sloped face for interference with the other of those surfaces, so as to cause the at least one slit to constrict when the collar is moved downwardly on the sleeve. Of course, the sleeve is so dimensioned that when the collar is moved upwardly and the at least one slit is substantially unconstricted, the sleeve can be easily fitted over the upstanding neck portion on the float; but when the collar is moved downwardly and the at least one slit is constricted, the sleeve is grippingly retained on the upstanding neck portion of the float. Moreover, the socket is so dimensioned as to receive and grippingly retain a chemiluminescent light stick, as described hereafter.

The present invention is an extension of that which is taught in United States Disclosure Document No. 135167 filed Feb. 20, 1985.

BRIEF DESCRIPTION OF THE DRAWINGS

The present invention will now be described in association with the accompanying figures of drawings, in which.

DESCRIPTION OF THE PREFERRED EMBODIMENTS

Figure 1:
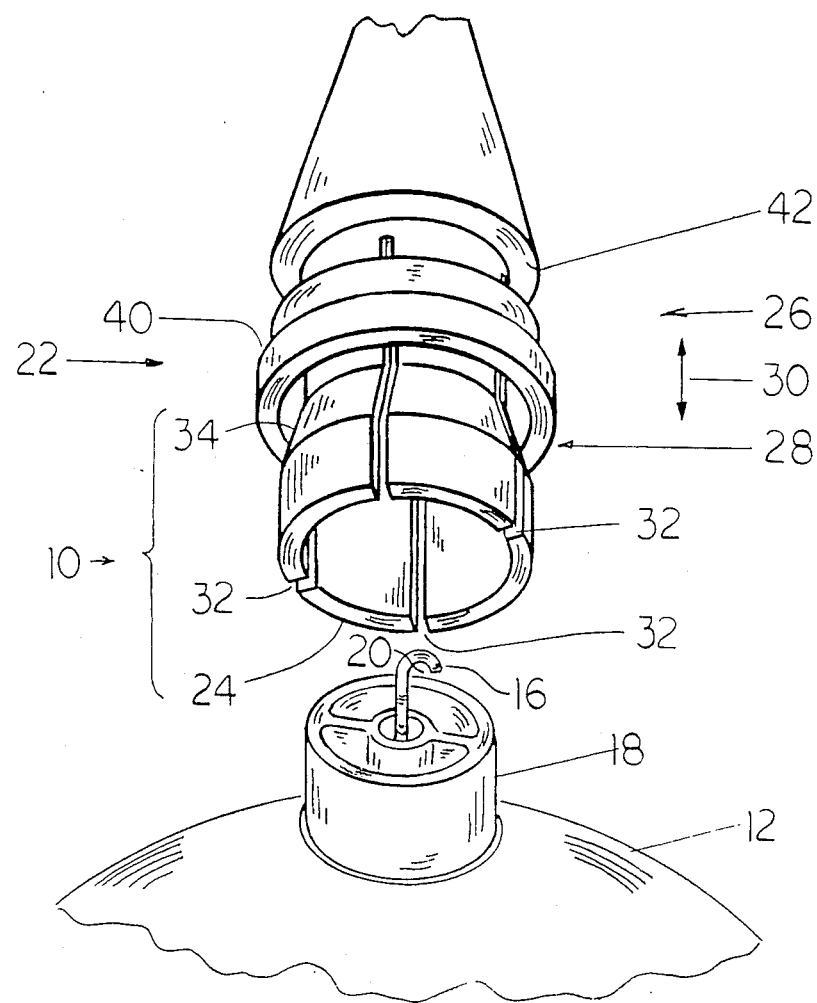
FIG. 1 is an exploded, perspective view of the principal co-operating portions of the float and attachment, according to the present invention, showing the relationship one to the other.
Figure 4:
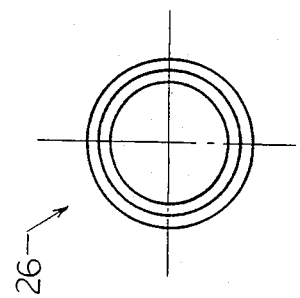
FIG. 4 is a plan view looking up from the bottom of a collar to be fitted over the body of FIGS. 2 and 3.
Figure 5:
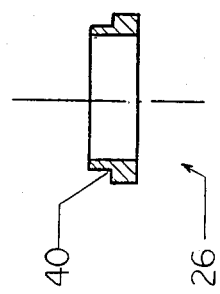
FIG. 5 is a cross-section of the collar of FIG. 4.

As stated above, it is the purpose of the present invention to provide a fishing float assembly which can comprise, as one of its principal components, a fishing float of the standard sort that may be available at most sporting goods stores. It is therefore not necessary to describe in detail the structure of the fishing float, except to discuss one or two features of that structure which the present invention can capitalize upon. Likewise, it is not the purpose of the present invention to describe in detail the chemistry or the structure of chemiluminescent light sticks, they have also been described generally as to their structure and with reference to relevant patents, above.

The fishing float assembly 10 according to the present invention therefore comprises a float 12 which is floatable in water, and which has at its top side means for attachment of the float to a fishing line. That means for attachment to a fishing line 14 includes a hook 16 which is normally substantially completely withdrawn into a neck portion 18. The neck portion 18 of the float 12 is substantially rigid, having a generally circular cross-section, and is upstanding from the float at the top thereof. The general construction of a usual fishing float is such that the neck portion is urged upwardly by a spring within the float, and may be depressed against that spring so as expose the bight 20 of the hook 16. The assembly of the float 12 is also generally such that the neck portion 18 and hook 16 may both be depressed against a further spring means within the float, so as to expose the bight of a further hook (not shown) at the bottom of the float for attachment of the float to a fishing line, as discussed hereafter.

An upper attachment portion 22 is adapted to fit over the upstanding neck portion 18 of the float 12. The attachment portion 22 comprises a body portion 24 and a collar 26 fitted over a constrictable sleeve 28 in the lower portion of the body 24. The collar 26 is moveable upwardly and downwardly over the sleeve 28, as shown at Arrow 30 in FIG. 1.

Figure 2:
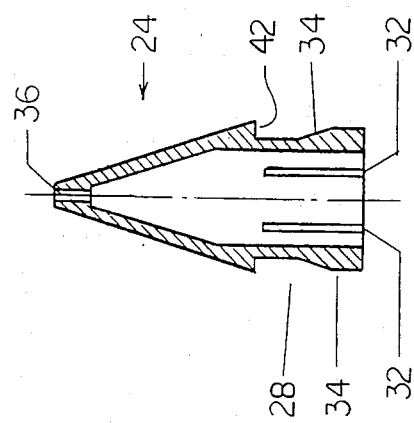
FIG. 2 is a view in cross-sectional elevation of the body portion of the attachment portion of the present invention.

At least one slit 32 (sometimes 2, usually 4) is formed in the sleeve 28, so that the bottom end of the sleeve 28 may be "squeezed" or constricted when the collar 26 is moved downwardly over the sleeve 28, thereby so as to grippingly retain the attachment portion 22 of the fishing float assembly of the present invention to the upstanding neck portion 8 of the float 12. To accommodate and effect the constricting action of the slit or slits 32, at least one of the outer surface of the sleeve 28 and the inner surface of the collar 26 has a sloped face for interference one with the other. As seen in FIGS. 1 and 2, the usual embodiment is for a sloped face 34 to be formed downwardly and outwardly on the sleeve portion 28 of the body 24; and obviously downward movement of the collar 26 over the sloping face 34 will cause interference of the inner surface of the collar 26 with the sloping face 34, and thereby cause the slits 32 to start to close or constrict.

At the upper end of the body 24, a socket 36 is formed through the material of the body in the top thereof. The socket 36 is so dimensioned as to receive and grippingly retain a chemiluminescent light stick of the sort described above and as discussed hereafter.

For example, when chemiluminescent light sticks of the sort sold by American Cyanamid Company in association with its trade mark CYALUME are used, those light sticks have a diameter of approximately 2.9 mm. and a length of 24 mm. The socket 36 is formed so as to be generally circular, except that there is a chord 38 across the circle of the socket, so as to reduce the dimension of the socket in a direction perpendicular to the chord to being less than the diameter of the circle.

Of course, to accommodate both the constricting action of the slits 32 when the collar is moved downwardly along the sleeve 28, and so as to grippingly retain a light stick in the socket 36, the body 24 is injection moulded of a suitable plastics material which is at least slightly resilient. Such materials as ABS, polyethylene, polystyrene, co-polymers, and the like, may be used.

The collar 26 may conveniently be formed with a slight shoulder 40 on its outside periphery, so as to allow for easier gripping by the fingers (or finger nails) as the collar 26 is moved downwardly over the sleeve 28 and the sloping face 34 thereof.

Likewise, a downwardly facing shoulder 42 is formed around the outer surface of the body 24, so as to constrain upward movement of the collar past that shoulder. Therefore, although the collar may be press fitted over the bottom end of the body 24, it is therafter relatively loosely but generally retained on the sleeve 28 by virtue of its interference with the sloping face 34 at the bottom of the sleeve 28 and the interference with the shoulder 42 at the top of the sleeve 28. It will also be noted that the body 24 is formed essentially as a truncated cone above the shoulder 42.

Figure 3:
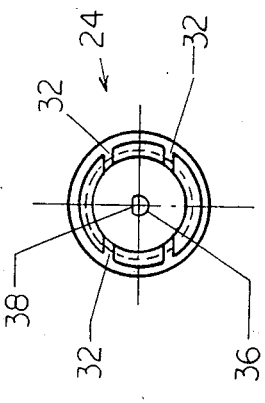
FIG. 3 is a view looking up from the bottom of FIG. 2.

In one embodiment of the invention, the slits 32 may be formed so as to be radially directed, substantially as shown in FIG. 1. In another embodiment invention, the slits may be formed so as to be on one or two chords across the sleeve 28, as shown in FIG. 3.

Figure 6:
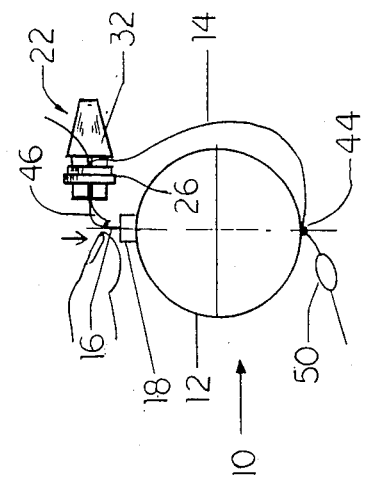
FIG. 6 is a diagrammatic view showing a step taken in the assembly of the fishing float assembly of the present invention to a fishing line.

Turning now to FIGS. 6 to 9, the assembly of the fishing float assembly of the present invention is now discussed. First, as shown in FIG. 6, the fishing line 14 may be attached to the bottom of the float 12 by depressing the collar 18 and hook 16, thereby securing the fishing line 14 in the bight of the bottom hook which is recessed within the float 12, at 44. The fishing line 14 is then secured to the top of the float by passing a loop 46 formed in the fishing line 14 through one of the slits 32 above the collar 26, depressing the neck 18 as shown in FIG. 6 to expose the bight 20 of the hook 16, and passing the loop 46 of the fishing line 14 through the bight 20 of the hook 16. Thereafter, the downward pressure against the collar 18 is released, and the fishing line 14 is secured to the float 12. [It is always best for the fishing line 14 to be attached to the float 12 at both the top and the bottom. If it is attached only at the top, a violant jerking action downward on the fishing line when a fish has been caught may cause the float assembly to submerge beneath the surface of the water, which may in turn not be as satisfactory as for there to be a noticeable bobbing action. Moreover, if the fishing line is attached only at the top of the float, the chemiluminescent light stick 52 may stay submerged beneath the surface of the water for so long as the fish is causing tension downwards on the fishing line 14.]

Figure 7:
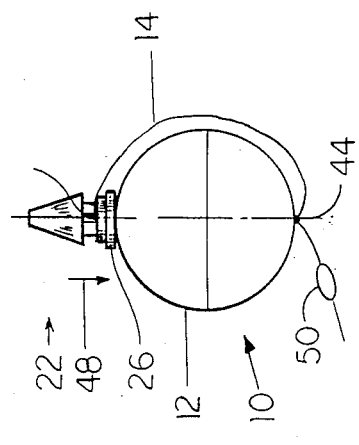
FIG. 7 is a diagrammatic view of the next step to be taken.

The next step, as shown in FIG. 7 and also from FIG. 1, is to assemble the attachment portion 22 to the float 12. That is simply accommodated by assuring that the collar 26 is moved upwardly along the sleeve 28, placing the sleeve over the neck 18, and thereafter moving the collar 26 down along the sleeve 28 as shown at Arrow 48 in FIG. 7. By now, the attachment portion 22 is grippingly retained on the upstanding neck portion 18 of the float 12, so that the assembled float and attachment portion can withstand the rigours of being placed in the water and particularly so that it can withstand wave motion or the possibly violant motion that the float 12 may undergo when a fish has been caught.

Suitably, a sinker 50 is attached to the fishing line 14 below the float 12.

Figure 8:
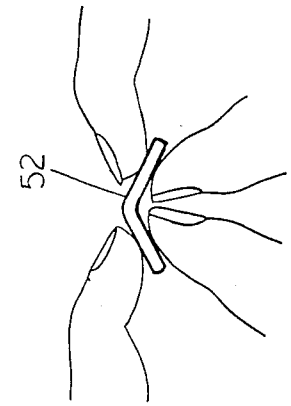
FIG. 8 is a diagrammatic view of the flexing action to be taken with respect to a light stick for assembly to the fishing float assembly of the present invention.
Figure 9:
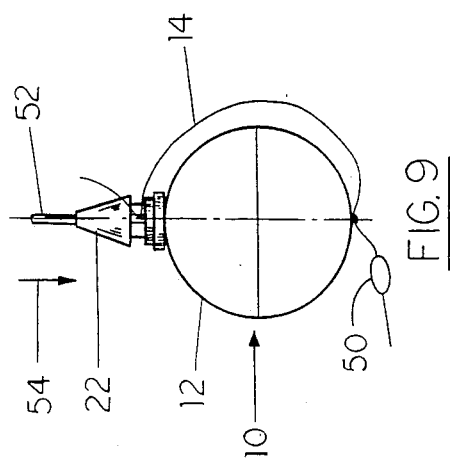
FIG. 9 is a diagrammatic view of the last step of assembly of a fishing float assembly according to the present invention.

The next step is to take a chemiluminescent light stick 52 and to flex it between the fingers, as shown in FIG. 8. Thereafter, the chemiluminescent light stick 52 is inserted into the socket 36 of the attachment portion 22, and it is pushed down into the socket as shown by Arrow 54 so as to be grippingly retained within the socket 36.

Obviously, detachment or dis-assembly of the attachment portion 22 from the float 12 is achieved simply by sliding the collar 26 upwardly along the sleeve 28, thereby releaving the constricting forces against the slit or slits 32, and permitting detachment of the attachment portion 22 from the float 12.

Tests have shown that, using a standard fishing float and a light stick as described above, the light stick may be visible for up to one hundred and fifty feet, throughout the entire night (up to twenty hours). There are no undue forces upon the assembly which cause it to disassemble, so that it may be possible once the fishing line 14 is assembled to the float 12, and the attachment portion 22 is assembled to the neck 18, for the assembly to remain in that condition. The insertion and removal of the light stick 52 is not conditional upon the attachment portion 22 being assembled to or not being assembled to the float 12. Indeed, as will be clear from FIGS. 6, 7 and 9, a violant jerk on the fishing line 124 by a fish having considerable size and weight will cause the upper portion of the fishing line 14 which is above the hook 16 and the float assembly 10—in other words, above the float assembly to the fishing rod—will create tension on that portion of the line and thereby cause further force against the upper side of the collar 26. That, in turn, will even more possitively guard against the chance of disassembly of the assembly 10 by inadvertent loosening of the sleeve 28 over the neck 18.

Even further, the structure of the luminescent light stick 52 is such that it has a specific gravity less than 1.0, and therfore it floats in the water; and the materials of the body 24 and collar 26 of the attachment portion 22 are plastics materials also having a specific gravity less than 1.0, so that in the event that it is dropped or by some reason detaches from the assembly, it will float.

There are in the market and available to the fisherman, several other kinds of fishing floats, to which the same general principals as described above apply. Thus, in all events, there is provided a fishing float assembly in respect of which a chemiluminescent light stick may be grippingly secured to the float, but which may be easily removed therefrom for storage and/or replacement.

In general, the other kinds of floats are referred to as rainbow style or quill type floats. In both incidents, however, they generally comprise a solid float body which may have a diameter of not more than 2 or 3 cm., and perhaps as little as 1.5 cm. Usually such a body is formed of very light wood such as balsam wood, or it may be a foamed plastic material or other low density material. A rod-like quill extends through a diametrically formed hole in the float, and by virtue of the sloping interior surface of the diametrical hole in the body and/or a tapered construction for the quill, the quill is retained in the body by interference fit. To attach such a float to a fishing line, the quill is simply removed or loosened in the hole, the fishing line passed through the hole, and the quill replaced.

The upper end of the quill therefore comprises a rodlike cylindrical neck portion. The distal end of that cylindrical neck may have an expanded or generally bulbous diameter of greater diameter than the portion of the neck immediately below it. In either event, a further embodiment of the present invention contemplates the use of a sleeve which is expandable at least at a first end thereof so as to fit over the distal end of the neck portion and to be retained thereon. The second end of the sleeve, remote from the first end, is so dimensioned as to receive and grippingly retain a chemiluminescent light stick.

In keeping with the further embodiments described herein, the fishing float assembly may comprise a float body 60 and a quill 62. The rod-like cylindrical neck portion 64 of the quill which extends above the body portion 60, in either embodiment of FIG. 11 or FIG. 12, has a distal end remote from the body portion and defined generally at 66.

A sleeve, defined generally at 68, has a first end 70 and is adapted to fit at the first end 70 over the distal end 66 of the neck portion 64.

As described in the Principal Disclosure, above, a chemiluminescent light stick 52 may be received and grippingly retained in the second end 72 of the sleeve 68, remote from the first end 70 thereof. The interior diameter of the sleeve at the second end 72 is, therefore, such that it will receive and grippingly retain the chemiluminescent light stick 52.

Figure 10:
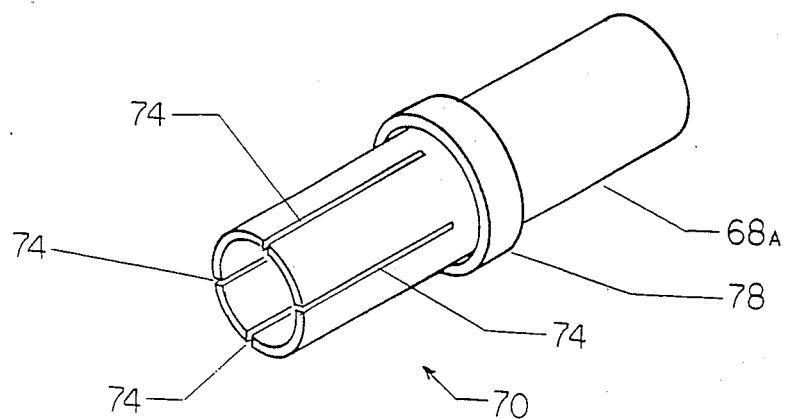
FIG. 10 is a perspective view of the first end of one further embodiment of fishing float according to the present assembly.
Figure 11:
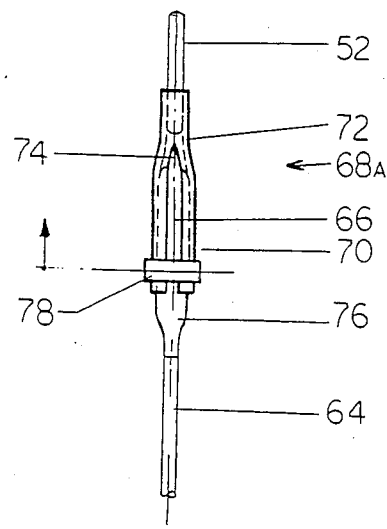
FIG. 11 is a partial elevation of the assembly of the sleeve and light stick of the embodiment of FIG. 10 to the distal end of the neck of a float.
Figure 12:
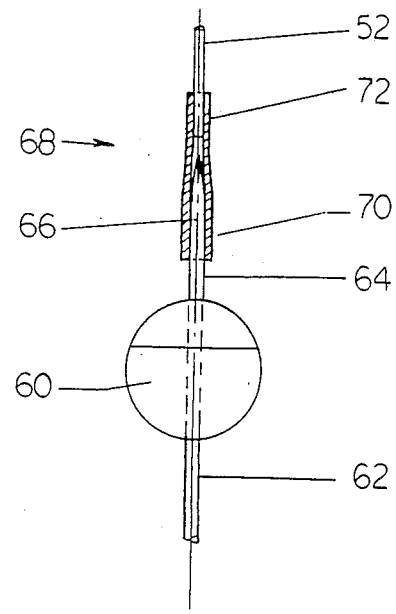
FIG. 12 is partially cross sectional elevation of a further, less complicated embodiment of a fishing float assembly according to the present invention.

In the embodiment of FIG. 12, the first end 70 of the sleeve 68 may simply be expandable due to its own elasticity, so as to fit over the distal end 66 of the neck portion 64 of quill 62. Due to the elasticity of the material of the sleeve, as discussed hereafter, when the sleeve 68 is placed over the distal end 66, it will be grippingly retained thereon. Usually, and as shown in FIG. 12, the distal end 66 of the quill 62 may be somewhat pointed in its configuration On the other hand, as shown in FIGS. 10 and 11, a further embodiment of the sleeve may be such that a plurality of axially directed slits 74 are formed at the first end 70 of the sleeve 68a, and are radially spaced around the first end 70. Usually, for ease of production, there are four slits 74 that are formed, which may be evenly spaced or placed in pairs so that the distance from one slit to the slit next to it in one direction is less than to the slit—which is the opposite of the pair—in the other direction.

This embodiment is particularly intended for use with rainbow or quill type floats where the distal end 66 of the neck portion of the quill has a generally bulbous configuration, as shown at 76 in FIG. 11. In that configuration, the diameter of the bulbous section 76 is greater than the diameter of the neck portion immediately below it.

Obviously, the sleeve 68a of the embodiment of FIGS. 10 and 11 is such that the first end 70 of the sleeve is expandable radially simply by spreading the portions at the first end of the sleeve which are between the axially extending slits 74.

However, so as to securely fasten the sleeve 68a to the bulbous distal end 76 as shown in FIG. 11, an expandable ring 78 may be used. The expandable ring is formed of a material which is relatively elastic, and is such that when it contracts it creates hoop stresses within the ring 78. The dimension of the ring 78—which may be such as an O-ring—may be such that it will be retained on the sleeve even when the first end 70 thereof is not radially expanded; and in such case, the material of the expandable ring 78 should be relatively easily stretched. Otherwise, the expandable ring 78 may, in any event, be placed over the sleeve 68a after it is placed on the bulbous distal end 76 of the quill; and in all events, the expandable ring 78 circumferentially extends over the plurality of axially formed slits 74 at the first end 70 of the sleeve 68a.

So as to accommodate the requisite expandability and contractibility of the material of the sleeve, particularly at the first end thereof, the sleeve may be formed of an elastic polymeric material. Such as an elastic polymeric material may be chosen from the group comprising polytetrafluoroethylene (TEFLON—trade mark), vinyl, and polyethylene.

The assembly described herein is closely related to the assembly described in the Principal Disclosure, and is defined by the appended claims supported by the Supplementray Disclosure.

Other specific embodiments, or modifications thereto, may be made beyond those described above as exemplary of the present invention, without departing from the spirit and scope of the appended claims.

We claim:

1. A fishing float assembly for use with a fishing line, having a float which is floatable in water and which has means at least at its top side for attachment to a fishing line, where said means for attachment includes a substantially rigid upstanding circular neck portion; and an attachment portion adapted to fit over said upstanding neck, where said attachment portion comprises:

a first body portion having a lower constrictable sleeve and an upper socket;

where said sleeve has at least one slit formed along at least a portion of the length thereof;

and a collar fitted over said sleeve and moveable up and down along the length thereof;

at least one of the outer surface of said sleeve and the inner surface of said collar having a sloped face for interference with the other of said surfaces so as to cause said at least one slit to constrict when said collar is moved downwardly on said sleeve;

the dimensions of the inside of said sleeve being such that when said collar is moved upwardly and said at least one slit is substantially unconstricted, said sleeve can be easily fitted over said upstanding neck portion of said float; and when said collar is moved downwardly and said at least one slit is constricted, said sleeve is grippingly retained on said upstanding neck portion of said float;

said socket in the upper portion of said attachment portion being so dimensioned as to receive and grippingly retain a chemiluminescent light stick.

2. The fishing float assembly of claim 1, where said float has means at the bottom thereof for attachment to a fishing line.

3. The fishing float assembly of claim 1, wherein said constrictable sleeve has a plurality of slits formed therein.

4. The fishing float assembly of claim 3, wherein said socket is dimensioned so as to grippingly receive a chemiluminescent light stick having a diameter of approximately 2.9 mm.

5. The fishing float assembly of claim 4, where said chemiluminescent light stick has a length of approximately 24 mm., and is of the sort sold in association with the trade mark CYALUME (T.M., American Cyanamid Company).

6. The fishing float assembly of claim 3, where said attachment portion is formed of a plastics material which is at least slightly resilient, and is formed so as to be generally circular in cross section except as to one portion thereof having a chord across the circle so as to reduce the dimension of said socket perpendicular to said chord to less than the diameter of said circle.

7. The fishing float assembly of claim 3, where said collar is constrained as to upward movement beyond said sleeve by a downwardly facing shoulder around the periphery of said attachment portion, which shoulder interferes with the upper edge of said collar.

8. The fishing float assembly of claim 4, where said chemiluminescent light stick is of the sort having a flexible light transmitting container that is filled with a first luminescent reactant, and a breakable container within said flexible container and filled with a second luminescent reactant; such that flexing said flexible container causes said breakable container to break, thereby allowing mixing of the two luminescent reactants, and thereby causing chemiluminescence.

9. The fishing float assembly of claim 7, where said attachment portion is formed as a truncated cone above said shoulder.

10. The fishing float assembly of claim 3, where said slits are radially directed.

11. The fishing float assembly of claim 3, where said slits are formed on at least one chord drawn across said sleeve.

12. The fishing float assembly of claim 3, where said outer surface of said sleeve is formed with a downwardly and outwardly sloping face.

13. The fishing float assembly of claim 2, where said neck portion is urged upwardly by a spring within said float, and may be depressed against said spring; and where said means for attachment to a fishing line comprises a hook whose bight is substantially completely withdrawn into said neck portion except when said neck portion is depressed.

14. The fishing float assembly of claim 13, where said neck portion and top fishing line attachment means may both be depressed against further spring means within said float so as to expose the bight of a further hook at said bottom fishing line attachment means.

15. A fishing float assembly for use with a fishing line, having a float which is floatable in water, where said float comprises a float body and an elongated, rod-like cylindrical neck portion which originates in the body and extends above the body portion, said neck portion and body portion being adapted for attachment to a fishing line;
- a sleeve means adapted at a first end thereof for fitting over the distal end of said neck portion, away from said body portion;
- said sleeve means having an interior diameter at a second end thereof, remote from said first end, for grippingly receiving and retaining a chemiluminescent light stick;
- and wherein at least the first end of said sleeve means is expandable in a radial direction and constrictable in a radial direction, so as to expand over and to be grippingly retained on said distal end of said neck portion.

16. The fishing float assembly of claim 15, where said distal end of said neck portion has a generally bulbous configuration of greater diameter than the portion of said neck between said distal end and said float body;
- and where said sleeve has a plurality of slits formed axially therein and spaced radially about the first end of said sleeve, so as to be expandable radially by spreading the portions of said first end of sleeve between said axially extending slits.

17. The fishing float assembly of claim 16, further comprising an expandable ring whose inner circumference can be expanded and which, when contracting, creates hoop stresses;
- where said expandable ring is placed over said first end of first sleeve so as to circumferentially extend over said plurality of axially formed slits at said first end of said sleeve.

18. The fishing float assembly of claim 15, where said sleeve is formed of an elastic polymeric material.

19. The fishing float assembly of claim 18, where said sleeve is formed from a material chosen from the group comprising polytetrafluoroethylene, vinyl, and polyethylene.

20. The fishing float assembly of claim 15, wherein said second end of said sleeve means has received therein a chemiluminescent light stick with a diameter of approximately 2.9 mm; and a length of approximately 24 mm.

* * * * *